United States Patent Office 3,386,959
Patented June 4, 1968

3,386,959
THERMOSETTING RESINOUS COMPOSITIONS
Cyrille van Eygen and Arthur Weerens, Watermael-Boitsfort, Belgium, assignors to UCB (Union Chimique-Chemische Bedrijven), Brussels, Belgium
No Drawing. Filed May 14, 1965, Ser. No. 455,950
Claims priority, application Great Britain, May 14, 1964, 20,649/64
8 Claims. (Cl. 260—67.5)

ABSTRACT OF THE DISCLOSURE

Thermosetting resinous compositions consisting of (a) copolymer of at least one olefinic compound (e.g., an ester of acrylic or methacrylic acid, etc.) and an unsaturated carboximide which is not substituted on the nitrogen (e.g., maleimide, etc.) and (b) a cross-linking agent which is hexamethylenetetramine or an addition compound thereof (e.g., with chloral), yield transparent colorless films or masses of exceptionally high resistance to water, dilute alkalis and organic solvents. The cross-linking agent advantageously amounts to about 0.25 to 20% by weight, based on the copolymer.

---

The present invention relates to thermosetting resinous compositions and to the production thereof, as well as to coatings obtained by curing said compositions and articles covered with said coatings.

It is known to prepare resinous compositions by the copolymerization of unsaturated monomers carrying a carboximide function with olefinic derivatives, such as vinyl chloride, acrylonitrile, styrene, acrylic esters, vinyl esters and the like.

It is also known to provide a reactive grouping in the aforesaid copolymers by replacing the hydrogen atom of the carboximide function for the purpose of cross-linking the resulting resinous compositions, one example being the copolymerization of N-methylol-maleimide with styrene or vinyl acetate.

In addition, Passerini (Gazetta Chimica Italiana, 53 (1923), 333) found that the product obtained by heating a mixture of hexamethylenetetramine and succinimide was tri-(N-methylene-succinimide)-amine, while Ionescu (Bull. Soc. Chim. France, 41 (1927), 692) has described the action of hexamethylenetetramine on compounds containing active hydrogen.

Hitherto, however, it has never been proposed to take advantage of the reactivity of hexamethylenetetramine towards the hydrogen atom of the imide function, for the preparation of thermosetting resinous compositions.

Thus, according to the present invention, there are provided thermosetting resinous compositions consisting (a) of copolymers of at least one olefinic compound and an unsaturated carboximide which is not substituted on the nitrogen, and (b) a cross-linking agent which is hexamethylenetetramine or an addition compound thereof.

According to infra-red spectral and nuclear magnetic resonance analysis, the cross-linking of the resinous compositions according to the present invention is effected in accordance with a formula similar to that proposed by Ionescu (loc. cit.); in particular, it is possible to follow the progress of the cross-linking by observing, by infra-red spectroscopy, the simultaneous disappearance of the absorption band due to the NH group of the imide and of a band at 670 cm.$^{-1}$ associated with hexamethylenetetramine.

This new form of cross-linking offers an important and unexpected advantage. In fact, it permits the rapid execution, under very moderate operating conditions, of the cross-linking of the thermosetting resinous compositions of the present invention. Transparent, colorless films or masses are obtained which have an exceptionally high resistance to water, dilute alkalis and solvents.

By "olefinic compound" there is to be understood any compound containing in its molecule one or more polymerizable double bonds, for example, aliphatic ethylenic compounds, such as ethylene, propylene, isobutadiene, isoprene, 2,3-dimethyl-butadiene, 2-chlorobutadiene, 2,3-dichlorobutadiene, 2-bromobutadiene, 2-fluorobutadiene and 2,3-difluorobutadiene; aromatic ethylenic compounds, such as styrene, vinyl-toluene, divinyl-benzene, alpha-chlorostyrene, vinyl-naphthalene, vinyl-pyridine, vinyl-carbazole and the like, acrylic and methacrylic acids and also the esters, amides and nitriles of these acids, for example, acrylamide, methacrylamide, methyl, ethyl and butyl acrylates and methacrylates and the like, acrylonitrile, methacrylonitrile, acrolein and the like; vinyl compounds, such as vinyl formate, acetate, propionate and butyrate, vinyl and vinylidene chloride, bromide and fluoride, vinyl methyl ether, vinyl ethyl ether, vinyl methyl ketone, vinyl ethyl ketone, vinyl isobutyl ketone, divinyl ketone, vinyl alkyl sulfones, such as vinyl ethyl sulfone, vinyl thioethers and the like. It is also possible to use a polymerizable unsaturated polyester obtained by the condensation of an alpha, beta-unsaturated dibasic or polybasic acid or an anhydride thereof, such as maleic acid or maleic anhydride, with a dihydric or polyhydric alcohol, such as ethylene glycol, diethylene glycol, glycerol or pentaerythritol, and possibly a saturated dicarboxylic or polycarboxylic acid, such as succinic acid, adipic acid, sebacic acid or phthalic acid. The thermosetting resinous compositions according to the present invention may contain one or more of the olefinic compounds, some examples of which are given above.

As examples of unsaturated carboximides which are not substituted on the nitrogen, there may be mentioned maleimide, itaconimide, citraconimide, glutaconimide, the halomaleimides, the C-alkyl and -alkoxymaleimides, C-vinyl- and allyl-tetrahydrophthalimide and the like.

The cross-linking agent used for the thermosetting of the resinous compositions of the present invention is hexamethylenetetramine or an addition compound thereof, for example, the addition compound with chloral.

In the resinous compositions of the present invention, the olefinic compound or compounds represent from 60 to 99.5% by weight, preferably 85 to 98% by weight, of the total polymerizable unsaturated compounds, while the unsaturated carboximide represents 0.5 to 40% by weight, preferably 2 to 10% by weight, of the total unsaturated polymerizable compounds.

The quantity of cross-linking agent added to the resinous compositions of the present invention varies from 0.25 to 20% by weight, preferably from 1 to 5% by weight, based on the unsaturated compounds to be polymerized.

The copolymerization of the olefinic compound or compounds with the unsaturated carboximide which is not substituted on the nitrogen, may be effected in a conventional manner, either dissolved in an organic solvent or in an aqueous emulsion.

For copolymerization in solution, use is made of the catalysts currently employed in polymerization in solution, for example, benzoyl peroxide or azo-bis-iso-butyronitrile. The solvent used as copolymerization medium in solution is so selected as to dissolve, at the same time, the olefinic monomer or monomers, the unsaturated carboximides, the copolymer formed and also the cross-linking agent. Solvents of this type are polar solvents and are preferably alcohols, ketones, chlorinated hydrocarbons and the like. In certain cases, it may be necessary to use a mixture of solvents in order to keep all the components of the mixture in solution. Copolymerization in solution is effected in a conventional manner by heating the mixture of monomers in the presence of the polymerization catalyst, which is added in one or more batches. A convenient method of operation consists in effecting the copolymerization at the boiling temperature of the solvent. The copolymerization time varies, depending on the polymerization temperature and the reactivity of the monomers used. The copolymer solution may be used as such for the purpose of cross-linking of a part of the solvent may be removed in order to obtain a more concentrated solution, which may, for example, contain up to 60% by weight of copolymer. It is also possible to replace part of the solvents used for the copolymerization by other solvents with the object of improving the quality of the film deposited by the solution.

For copolymerization in emulsion, use is made of polymerization catalysts which are soluble in water, for example, hydrogen peroxide, potassium persulfate, ammonium persulfate, a redox system and the like. The copolymerization is effected in known manner by stirring the aqeous medium containing the monomers and the catalyst in the presence of one or more emulsifiers, such as alkyl aryl sulfonates, non-ionic oxyethylation products of alcohols, alkyl-phenols, acids or amines having a hydrocarbon chain containing at least 8 carbon atoms, and the like, and stirring the aqueous emulsion at a temperature between room temperature and the boiling point of the emulsion. Here again, the copolymerization time is dependent upon the temperature of polymerization and the reactivity of the monomers used.

The aqueous copolymer emulsion thus obtained may be used as such for the cross-linkage or it may be concentrated by eliminating a part of the water. In general, the emulsions contain up to 60% by weight of copolymer.

In order that the resinous compositions of the present invention may be ready for use, the cross-linking agent is added at room temperature to the above-described solutions or emulsions of copolymers and then completely dissolved by agitation. If necessary, pigments, plasticizers and other conventional additives may be added and thoroughly distributed throughout the mass. The resinous compositions are applied to the substrate to be covered, the solvent or water evaporated and the film cured at a temperature of 70 to 160° C., preferably of 90 to 140° C., for a period of time which varies from 2 to 60 minutes, depending on the monomers used and the temperature employed during the cross-linking.

In general, the longer the time and the higher the crosslinging temperature, the more insoluble the film deposited will become.

It is to be noted that it is possible to effect the setting of the resinous compositions outside the temperature range of 70 to 160° C.; nevertheless, at temperatures below 70° C., the setting time is too long from the practical point of view, while at temperatures above 160° C., the risk of coloration of the coated film increases with the rise in temperature.

The film or coatings formed by the resinous compositions according to the present invention are remarkable by their transparency. Their hardness and flexibility will vary with the nature of the monomers used. Thus, hardness is particularly great in the case of films prepared from the resinous compositions of the present invention which contain a high proportion of methyl methacrylate. Resistance to the action of water, dilute alkalis and conventional organic solvents is exceptionally high; certain films perfectly withstand treatment at boiling point for several dozens of hours with very aggressive solvents, such as acetone and dimethyl formamide.

The resinous compositions of the present invention are, therefore, eminently suitable for numerous applications in the field of paints, varnishes, enamels, textile dressings and coatings of all kinds which have to withstand chemical reagents and heat.

The following examples are given for the purpose of illustrating the present invention, the parts and percentages being by weight, unless otherwise indicated.

Example 1.—Preparation of a resinous solution 500 parts of acetone and 12 parts of maleimide are introduced into a round-bottomed glass flask provided with an agitator, a reflux cooler, a dropping funnel and a thermometer, the flask being purged by passing a current of nitrogen through it. The mixture is gradually brought to boiling under reflux, and 1 part of azo-bis-isobutyronitrile is added. 200 parts of methyl methacrylate are then added over a period of 3 hours. When all the methyl methacrylate has been added, a further 1 part of azo-bis-isobutyronitrile is added and the heating under reflux continued for 20 hours. The mixture is then allowed to cool and a viscous solution containing 29% of dry material is thus obtained.

16 parts of hexamethylenetetramine are then added to the cold solution and the latter stirred until complete dissoltuion is effected. A solution ready for use is obtained.

Th viscous solution is poured on to glass plates and the solvent allowed to evaporate at room temperature. After drying, the films which are thus obtained are detached from the glass plates.

In a series of tests, the films are heated for 30 minutes in an oven at 110° C., while in another series of tests, they are heated for 5 minutes at 150° C. In both cases, the films have become practically insoluble in common solvents. Thus, the films may be extracted in boiling acetone for 30 minutes without any loss of weight being observed. In addition, if the curing is effected at 150° C., but for 1 hour instead of for 5 minutes, insolubility becomes such that the film will withstand, without loss of weight, an extraction for 50 hours with acetone in a Soxhlet apparatus.

Example 2.—Preparation of a resinous solution 760 parts of methyl ethyl ketone, 150 parts of butyl methacrylate, 150 parts of methyl methacrylate and 30 parts of maleimide are introduced into the apparatus described in Example 1, after purging with a current of nitrogen. The mixture is heated under reflux, while adding 6 parts of benzoyl peroxide. After heating for 12 hours under reflux, about 2 parts of benzoyl peroxide are added and heating under reflux is continued for 12 hours. Analysis of a sample taken from the mixture shows that at that moment less than 0.5% of residual monomers remain. The viscous solution, which contains 31% of dry materials, is cooled.

7.5 parts of the addition product of hexamethylenetetramine with chloral, dissolved in 50 parts of an acetone-water mixture (50:50), are added to the cooled solution and the latter is stirred vigorously until dissolution is complete.

Films are prepared in the same manner as in Example 1. In a first series of tests, the film is cured for 30 minutes at 150° C.; the hardened film thus obtained loses only 5% of its weight when heated at 60° C. for 30 minutes in dimethyl formamide. In a second series of tests, the film is heated at 150° C. for 1 hour; this film perfectly withstands heating in dimethyl formamide at 60° C. for 30 minutes.

Example 3.—Preparation of a resinous solution

When a copolymer of ethyl acrylate containing 8% of maleimide is prepared under the same conditions as in Example 1 and 16 parts of the addition compound of hexamethylenetetramine with chloral are added to the viscous copolymer solution in the same proportions as in Example 1, a solution is obtained which, upon evaporation, yields a film of thermosetting resin. Total insolubility in common solvents is obtained either by curing for 2 minutes at 150° C. or by curing for 30 minutes at 90° C.

Example 4.—Preparation of an aqueous resinous emulsion 225 parts of distilled water, 2 parts of a polyoxyethylated nonylphenol sulfonate and 6 parts of a polyoxyethylated oleocetyl alcohol are added successively to the apparatus described in Example 1, which has been previously purged with a current of nitrogen. The mixture is heated to 75° C. and 0.2 parts of ammonium persulfate added thereto and then, at the same temperature, there is introduced, over a period of 30 minutes, a mixture of 85 parts of ethyl acrylate, 85 parts of methyl methacrylate and 7.5 parts of maleimide. When the addition is completed, the temperature is raised to 85° C. and maintained at that level for 30 minutes. The mixture is then allowed to cool and a latex is thus obtained which contains 44% of dry material.

6 parts of hexamethylenetetramine are added to the latex and the latter is agitated until dissolution is complete. After this addition, the latex is ready for use.

As in Example 1, films are prepared on glass plates and then subjected to curing at 150° C. for variable periods of time. It is thus found that the films become completely insoluble in boiling acetone when the curing time is 30 minutes.

We claim:
1. A thermosetting resinous composition consisting essentially of:
    (a) a copolymer of at least one ethylenically unsaturated compound and an aliphatic ethylenically unsaturated dicarboxylic acid imide, which is unsubstituted on the nitrogen atom, and
    (b) a cross-linking agent selected from the group consisting of hexamethylene-tetramine and its addition compound with chloral.
2. A composition as claimed in claim 1, wherein the unsaturated olefinic compound is selected from the group consisting of lower alkyl esters of acrylic and methacrylic acid.
3. A composition as claimed in claim 1, wherein the unsaturated dicarboxylic acid imide is maleimide.
4. A composition as claimed in claim 1, wherein the cross-linking agent is hexamethylenetetramine.
5. A composition as claimed in claim 1, wherein the cross-lnking agent is the addition compound of hexamethylenetetramine with chloral.
6. A composition as claimed in claim 1, wherein the copolymer contains from 60 to 99.5% by weight of at least one ethylenically unsaturated compound and from 0.5 to 40% by weight of unsaturated dicarboxylic acid imide.
7. A composition as claimed in claim 1, wherein the amount of cross-linking agent is of from 0.25 to 20% by weight, based on the amount of copolymer.
8. A process for producing coatings consisting essentially of applying a composition as claimed in claim 1 on a substrate, drying and curing the film applied at a temperature of from 70 to 160° C. for a period of from 2 to 60 minutes.

References Cited

UNITED STATES PATENTS

| | | | |
|---|---|---|---|
| 2,393,972 | 2/1946 | Cairns | 260—78 |
| 2,734,004 | 2/1956 | Robinson | 260—78 |
| 2,743,260 | 4/1956 | Tawney | 260—78 |
| 2,749,331 | 6/1956 | Breslow | 260—72 |
| 2,982,753 | 5/1961 | Holmes et al. | 260—73 |
| 3,043,805 | 7/1962 | Burg | 260—72 |
| 3,194,790 | 7/1965 | Brown | 260—73 |

WILLIAM H. SHORT, *Primary Examiner.*

HAROLD D. ANDERSON, *Examiner.*